US012791728B2

(12) United States Patent
Chung et al.

(10) Patent No.: US 12,791,728 B2
(45) Date of Patent: Nov. 10, 2026

(54) GLOBAL NAVIGATION SATELLITE SYSTEM (GNSS) AIDING

(71) Applicant: Google LLC, Mountain View, CA (US)

(72) Inventors: Sherk Chung, Kirkland, WA (US); Ian Andrew Atkinson, Hayward, CA (US); Saket Patkar, Mountain View, CA (US)

(73) Assignee: Google LLC, Mountain View, CA (US)

(*) Notice: Subject to any disclaimer, the term of this patent is extended or adjusted under 35 U.S.C. 154(b) by 237 days.

(21) Appl. No.: 18/702,699

(22) PCT Filed: Jul. 28, 2023

(86) PCT No.: PCT/US2023/071197
§ 371 (c)(1),
(2) Date: Apr. 18, 2024

(87) PCT Pub. No.: WO2025/029281
PCT Pub. Date: Feb. 6, 2025

(65) Prior Publication Data
US 2025/0231301 A1 Jul. 17, 2025

(51) Int. Cl.
*G01S 19/05* (2010.01)
*G01S 19/37* (2010.01)

(52) U.S. Cl.
CPC .............. *G01S 19/05* (2013.01); *G01S 19/37* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0207076 | A1 | 8/2009 | Schipper et al. | |
| 2009/0309787 | A1* | 12/2009 | Gildea | G01C 21/3641 342/357.31 |
| 2011/0206039 | A1 | 8/2011 | Lee et al. | |
| 2012/0056781 | A1 | 3/2012 | Kong et al. | |

(Continued)

FOREIGN PATENT DOCUMENTS

| | | | |
|---|---|---|---|
| CN | 101246210 A | | 8/2008 |
| CN | 101651789 A | * | 2/2010 |

OTHER PUBLICATIONS

Fabio Dovis et al., "An assisted high-sensitivity acquisition technique for GPS indoor positioning", Position, Location and Navigation Symposium, Piscataway, NJ, USA, May 5, 2008, 12 pp.

(Continued)

*Primary Examiner* — Olumide Ajibade Akonai
*Assistant Examiner* — Eric K Hodac
(74) *Attorney, Agent, or Firm* — Shumaker & Sieffert, P.A.

(57) ABSTRACT

An example method includes obtaining, by a global navigation satellite system (GNSS) processor of a mobile computing device and based on signals received from GNSS satellites, a stream of I/Q samples; providing, by the GNSS processor and for another processor, the stream of I/Q samples; receiving, by the GNSS processor and from the other processor, aiding data that is determined based on the stream of I/Q samples, wherein the aiding data, that includes: a code phase, a frequency, and a time for a GNSS satellite of the GNSS satellites; and processing, by the GNSS processor and based on the aiding data, the stream of I/Q samples to determine a first fix for the mobile computing device.

16 Claims, 5 Drawing Sheets

(56) References Cited

U.S. PATENT DOCUMENTS

| | | | | |
|---|---|---|---|---|
| 2012/0293366 | A1* | 11/2012 | Liu | G01S 19/24 342/357.26 |
| 2015/0097728 | A1 | 4/2015 | Chansarkar et al. | |
| 2020/0204340 | A1 | 6/2020 | Curran | |
| 2021/0048537 | A1 | 2/2021 | Marmet | |
| 2022/0137236 | A1 | 5/2022 | Conflitti et al. | |
| 2023/0076938 | A1* | 3/2023 | Stegmaier | G01S 19/01 |

OTHER PUBLICATIONS

Invitation to Pay Additional Fees from International Application No. PCT/US2023/071197, dated Mar. 5, 2024, 9 pp.

Ublox, "SARA-R5 series", Positioning Implementation, Oct. 2, 2020, 64 pp.

Dovis et al., "An Assisted High-Sensitivity Acquisition Technique for GPS Indoor Positioning", Proceedings of IEEE/Ion Plans 2008, May 6, 2008, pp. 1350-1361.

International Search Report & Written Opinion for International Application No. PCT/US2023/071197, dated May 28, 2024, 16 pp.

* cited by examiner

GLOBAL NAVIGATION SATELLITE SYSTEM (GNSS) AIDING

BACKGROUND

Smartphones, wearable computing devices, vehicle navigation systems, and other types of devices often include a receiver configured to perform location determination using the Global Positioning System (GPS), and other GNSS (Global Navigation Satellites Systems). GPS is a satellite-based navigation system that involves a network of satellites configured to transmit positioning signals (i.e., signals) to Earth while circling Earth in a precise orbit. Each satellite transmits signals that include information for receivers to use, such as an indication of the time that each signal was transmitted by the satellite and position information for the satellite. Other GNSS constellations, such as GLONASS, Galileo, BeiDou, QZSS, and IRNSS, operate similarly, and may also be used for location determination.

A GNSS receiver in a mobile computing device may receive and use information within signals from multiple satellites to estimate a location of the mobile computing device. For example, the receiver may use trilateration to estimate the user's location on the surface of Earth by timing signals obtained from at least four GNSS satellites. Upon receiving a signal from a satellite, the receiver may determine the time that the signal was received at the receiver and compare that time to the time that the signal was transmitted by the satellite as indicated within the signal. The receiver may then determine the distance to the satellite based on the determined time difference. By using signals from multiple satellites, the receiver may determine its location.

SUMMARY

In general, aspects of this disclosure are directed to mobile computing devices that include GNSS aiding modules that improve GNSS location acquisition. For instance, a mobile computing device may include a GNSS processor that receives satellite data (e.g., I/Q samples) and determine a first fix of the mobile computing device based on the satellite data. The determination of the first fix may be referred to as an acquisition phase.

The GNSS processor may also utilize assisted GPS (A-GPS). For instance, the GNSS processor may receive A-GPS assistance data via a wireless network to which the mobile computing device is connected. A-GPS assistance data may include approximate time of about Ims accuracy, approximate location of roughly 100 m accuracy, and satellite orbital data. The GNSS processor may utilize the A-GPS data to determine a first fix during an acquisition phase. Even though A-GPS may improve the performance of a GPS system, even A-GPS systems may struggle in difficult environments where there is no clear line-of-sight to many satellites. Such environments include indoors, underground, in dense forests, or dense urban canyons. In such cases, the time to first fix (TTFF) for A-GPS can be much longer than desired, which may result in suboptimal battery consumption. In other cases, the GNSS processor may not be able to acquire a location at all with the A-GPS assistance data. Therefore, it may be desirable to improve GNSS acquisition performance.

In accordance with one or more aspects of this disclosure, in addition to a GNSS processor, a mobile computing device may include an advanced aiding module (AAM) that may provide data to the GNSS processor that enables one or both of a reduction in time to first fix (TTFF) or an improvement in signal strength sensitivity. For instance, the AAM may receive satellite data (e.g., I/Q samples) and process the satellite data to generate aiding data for the GNSS processor. The GNSS processor may utilize the aiding data to improve the acquisition phase (e.g., to reduce the TTFF or to enable use of weaker satellite signals). In this way, the AAM may improve GNSS acquisition performance.

As one example, a method includes obtaining, by a global navigation satellite system (GNSS) processor of a mobile computing device and based on signals received from GNSS satellites, a stream of I/Q samples; providing, by the GNSS processor and for another processor, the stream of I/Q samples; receiving, by the GNSS processor and from the other processor, aiding data that is determined based on the stream of I/Q samples, wherein the aiding data that includes at least one of: a code phase, a frequency, and a time for a GNSS satellite of the GNSS satellites; and processing, by the GNSS processor and based on the aiding data, a first fix for the mobile computing device.

As another example, a mobile computing device includes a global navigation satellite system (GNSS) antenna; and a GNSS processor configured to: generate, based on signals received from GNSS satellites via the GNSS antenna, a stream of I/Q samples; provide, for another processor, the stream of I/Q samples; receive, from the other processor, aiding data that is determined based on the stream of I/Q samples, wherein the aiding data that includes at least one of: a code phase, a frequency, and a time estimate for a GNSS satellite of the GNSS satellites; and process, based on the aiding data, a stream of I/Q samples to determine a first fix for the mobile computing device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
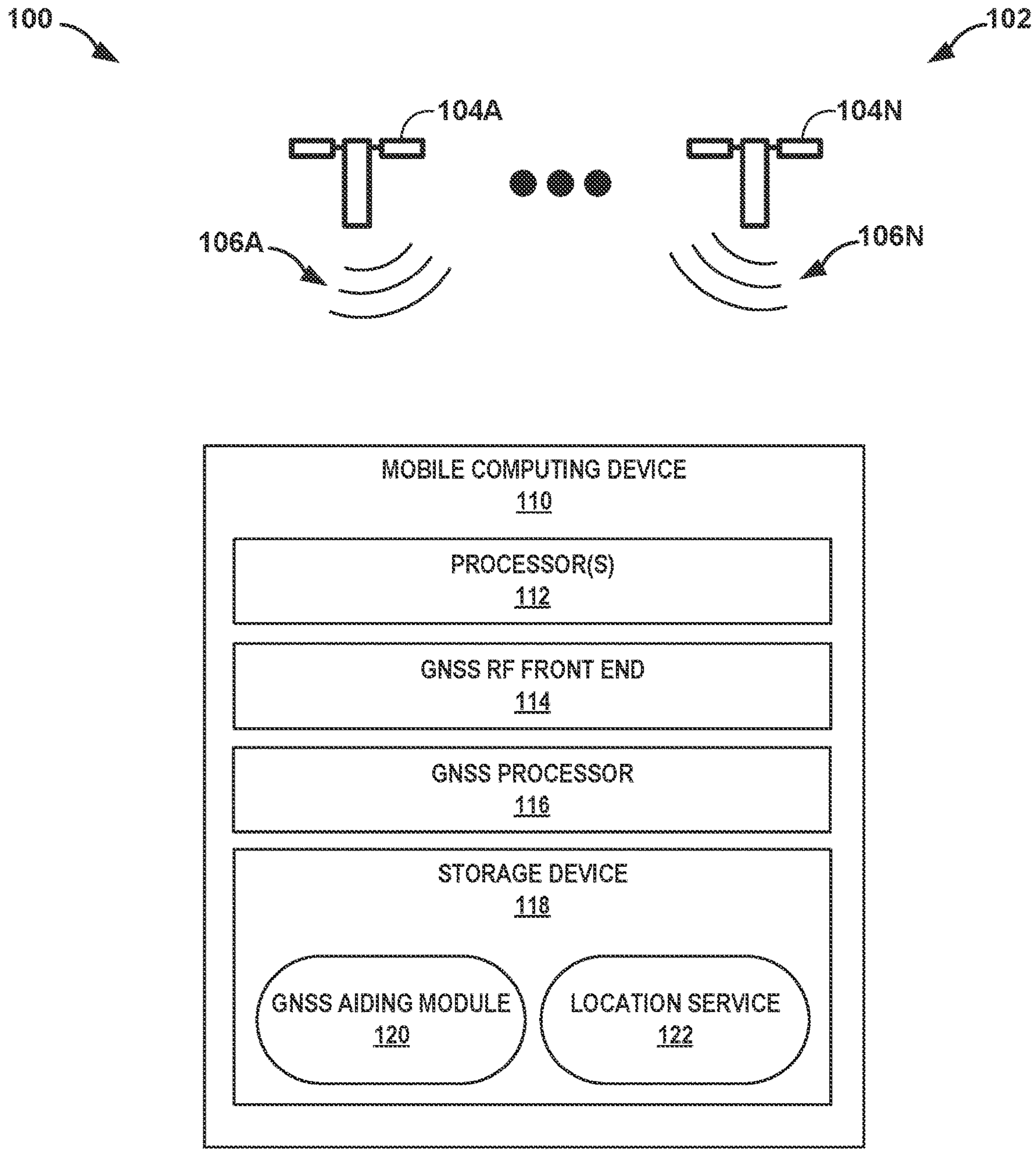
FIG. 1 is a conceptual diagram illustrating an example system 100 that includes GNSS constellation 102 and mobile computing device 110, in accordance with one or more aspects of this disclosure.

FIG. 1 is a conceptual diagram illustrating an example system 100 that includes GNSS constellation 102 and mobile computing device 110. GNSS constellation 102 may include a plurality of GNSS satellites 104A-104N (collectively, "GNSS satellites 104") that each transmit a respective GNSS signal of GNSS signals 106A-106N (collectively, "GNSS signals 106"). GNSS satellites 104 may be included in any GNSS constellation, such as GPS, GLONASS, Galileo, BeiDou, QZSS, and IRNSS.

Mobile computing device 110 may be a portable device that includes components that determine a position of mobile computing device (e.g., a latitude and a longitude). As shown in FIG. 1, mobile computing device 110 may include one or more processors 112, GNSS radio frequency (RF) front end 114, GNSS processor 116, and storage device 118, which may include GNSS aiding module 120 and location service 122. Examples of mobile computing device 110 include, but are not limited to, mobile phones, gaming devices, vehicles, tablets, cameras, laptops, wearable computing devices, e-book readers, etc.

Processors 112 may implement functionality and/or execute instructions within mobile computing device 110. Examples of processors 112 include, but are not limited to, one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein.

GNSS radio frequency (RF) front end 114 may include various components that receive RF signals and generate a stream of digital samples that correspond to the received RF signals. For instance, GNSS RF front end 114 may include one or more antennas (e.g., one or more GNSS antennas) that convert RF signals (i.e., GNSS signals 106) into analog signals, one or more demodulators that demodulate the analog signals into analog I/Q signals (e.g., to remove a carrier signal, such as a 1575.42 MHz carrier signal), and one or more analog to digital converters (ADCs) that convert the analog I/Q signals into a stream of digital I/Q samples. In some examples, components of GNSS RF front end 114 may exclusively process GNSS signals. In other examples, components of GNSS RF front end 114 may process other signals (e.g., cellular, Wi-Fi, etc.). GNSS RF front end 114 may output a stream of I/Q samples (e.g., cither analog or digital) to one or more other components of mobile computing device 110, such as GNSS processor 116.

GNSS processor 116 may be a processor of mobile computing device 110 that performs GNSS operations, such as acquisition and tracking. GNSS processor 116 may be a separate component within mobile computing device 110 from processors 112 (e.g., GNSS processor 116 may be a separate chip from processors 112). For example, GNSS processor 116 may be its own chip, or may be included in a baseband or modem chip. In some examples, GNSS processor 116 may be a special purpose section of one of processors 112 (e.g., separate from an application processor). As such, GNSS processor 116 may be considered to be a different processor than processors 112.

Storage device 118 may include one or more computer-readable storage media. For example, storage device 118 may be configured for long-term, as well as short-term storage of information, such as instructions, data, or other information used by mobile computing device 110. In some examples, storage device 118 may include non-volatile storage elements. Examples of such non-volatile storage elements include magnetic hard disks, optical discs, solid state discs, and/or the like. In other examples, in place of, or in addition to the non-volatile storage elements, storage device 118 may include one or more so-called "temporary" memory devices, meaning that a primary purpose of these devices may not be long-term data storage. For example, the devices may comprise volatile memory devices, meaning that the devices may not maintain stored contents when the devices are not receiving power. Examples of volatile memory devices include random-access memories (RAM), dynamic random-access memories (DRAM), static random-access memories (SRAM), etc.

Location service 122 may, with explicit user permission, provide a location mobile computing device 110 to one or more applications and/or other modules of mobile computing device 110. In some examples, location service 122 may be a service executed by processors 112. Location service 122 may receive the location of mobile computing device 110 from one or more other components of mobile computing device 110, such as GNSS processor 116.

In operation, GNSS processor 116 may initially perform an acquisition phase to determine a first fix of mobile computing device 110. To determine the first fix, GNSS processor 116 may determine a respective code phase, frequency, and time for a plurality of GNSS satellites 104. For instance, GNSS processor 116 may receive a stream of I/Q samples from GNSS RF front end 114, and process the stream of I/Q samples to determine the respective code phase, frequency, and time for each GNSS satellite of the plurality of GNSS satellites 104. To process the stream of I/Q samples, GNSS processor 116 may search for the code phases, frequencies, and times by searching a correlation peak across a search space (e.g., potential PRN codes). GNSS processor 116 may utilize different times to perform the correlations. Longer times may provide higher noise suppression, but also increase the TTFF. GNSS processor 116 may determine that a particular GNSS satellite of GNSS satellites 104 is acquired/detected if a highest correlation peak is greater than a threshold.

Based on the determined code phases, frequencies, and times for the plurality of GNSS satellites 104, GNSS processor 116 may determine the first fix for mobile computing device 110. For instance, GNSS processor 116 may utilize the determined code phases, frequencies, and times for the plurality of GNSS satellites 104 to decode navigation messages (e.g., navbits) encoded in GNSS signals 106, and determine the first fix based on the decoded navigation messages.

Once GNSS processor 116 acquires the first fix, GNSS processor 116 may enter a tracking mode in which GNSS processor 116 tracks/monitors the position of mobile computing device 110. The tracking mode may be substantially simpler and/or less complex than the acquisition mode.

In some examples, GNSS processor 116 may utilize A-GPS (e.g., assisted GNSS) to reduce the time to first fix (TTFF). For instance, GNSS processor 116 may receive approximate time and orbital data of one or more of GNSS satellites 104 from processors 112. Even though A-GPS may improve the performance of GNSS processor 116, GNSS processor 116 may struggle in difficult environments where there is no clear line-of-sight to many satellites. Such environments include indoors, underground, in dense forests, or dense urban canyons. In such cases, the TTFF for GNSS processor 116 can be much longer than desired, which may result in suboptimal battery consumption. In other cases, GNSS processor 116 may not be able to acquire a location at all with the A-GPS assistance data. Therefore, it may be desirable to improve GNSS acquisition performance.

In accordance with one or more aspects of this disclosure, mobile computing device 110 may include GNSS aiding module 120, which may provide data to GNSS processor 116 that enables one or both of a reduction in TTFF or an improvement in signal strength sensitivity. For instance, GNSS aiding module 120 may receive satellite data (e.g., I/Q samples) and process the satellite data to generate aiding data for GNSS processor 116. As opposed to A-GPS information, the aiding data provided by GNSS aiding module 120 may include an exact code phase, frequency, and time for a GNSS satellite of GNSS satellites 104. As also opposed to A-GPS, GNSS processor 116 may utilize actual I/Q samples to determine the aiding data. In some examples, in addition to the I/Q samples, GNSS aiding module 120 may further determine the aiding data based on seed data. The seed data may be similar to A-GPS information (e.g., one or more of: an approximate time, satellite orbital data, and an approximate location of the mobile computing device). However, by further utilizing the satellite data (e.g., the I/(samples), GNSS aiding module 120 may be able to compute the aiding data that enables GNSS processor 116 to acquire the plurality of GNSS satellites 104 and compute the first fix faster than GNSS processor 116 would have been able to on its own. As such, GNSS processor 116 may utilize the aiding data to accelerate the determination of the first fix. In this way, GNSS aiding module 120 may improve GNSS acquisition performance of mobile computing device 110.

Figure 2:
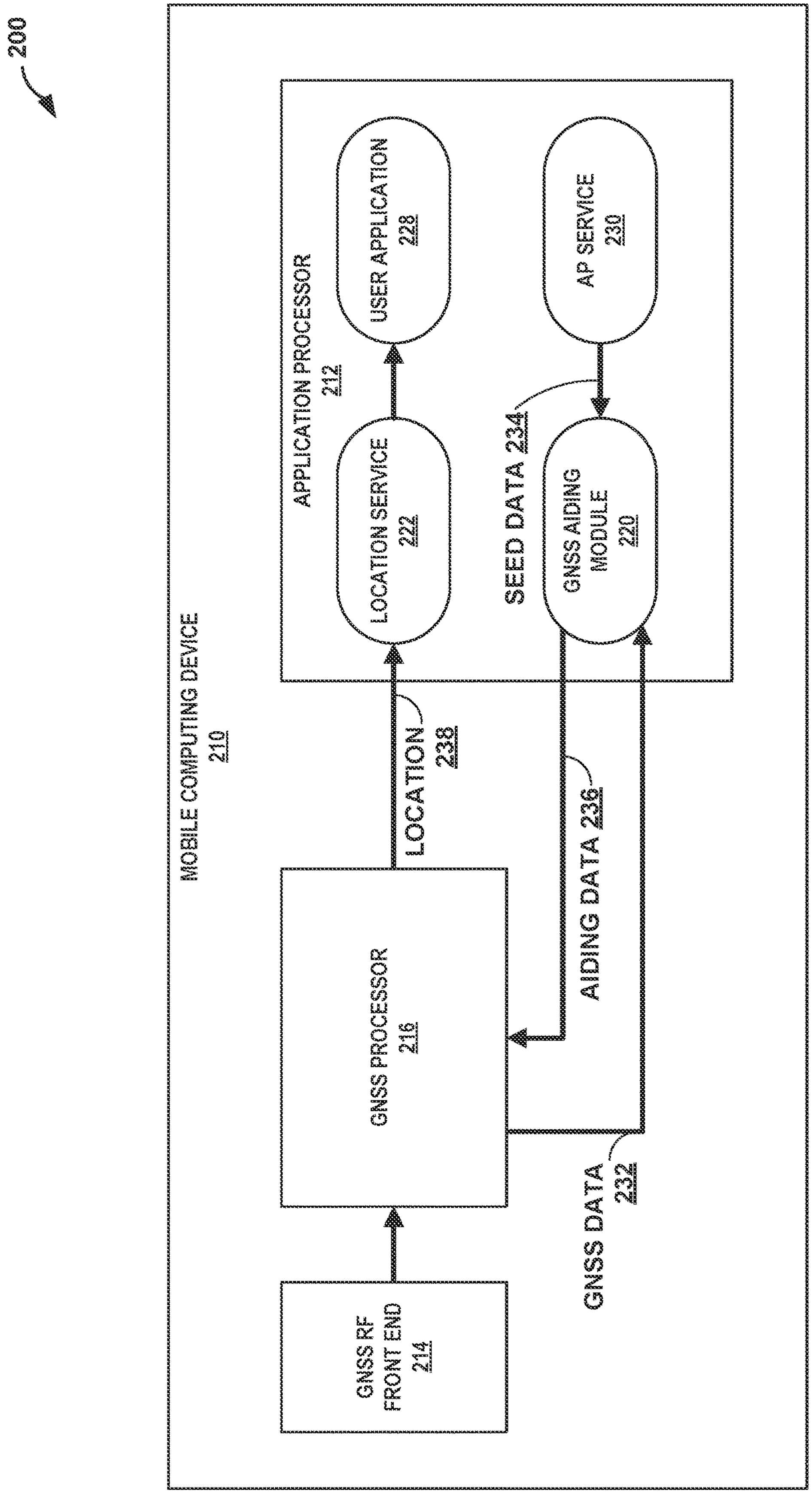
FIG. 2 is a conceptual diagram illustrating an example system 200 that includes mobile computing device 210, in accordance with one or more aspects of this disclosure.

FIG. 2 is a conceptual diagram illustrating an example system 200 that includes mobile computing device 210. Mobile computing device 210 of FIG. 2 may be an example of mobile computing device 110 of FIG. 1. Similarly, application processor 212, GNSS RF front end 214, GNSS processor 216, GNSS aiding module 220, and location service 222 may respectively be examples of processors 112, GNSS RF front end 114, GNSS processor 116, GNSS aiding module 120, and location service 122 of FIG. 1.

In the example of FIG. 2, GNSS aiding module 220, location service 222, user application 228, and AP service 230 are illustrated as being within application processor 212. For instance, application processor 212 may execute GNSS aiding module 220, location service 222, user application 228, and AP service 230.

Similar to GNSS aiding module 120, GNSS aiding module 220 may process satellite data to generate aiding data that enables GNSS processor 216 to improve first fix determination (e.g., a reduction in TIFF or improved signal strength tolerance). FIG. 2 illustrates an example data flow. For instance, GNSS processor 216 may provide GNSS data 232 (e.g., a stream of I/Q samples) to GNSS aiding module 220. GNSS aiding module 220 may utilize GNSS data 232 to determine and provide aiding data 236 to GNSS processor 216.

As noted above, GNSS processor 216 may utilize aiding data 236 to obtain a first fix of mobile computing device 210, which may be a location of mobile computing device 210. GNSS processor 216 may output this determined location to location service 222 as location 238. GNSS processor 216 may continue to track mobile computing device 210 and update location 238. Location service 222, as discussed above, may provide location 238 (or another indication of the location of mobile computing device 210, with user consent) to one or more other components of mobile computing device 210, such as user application 228.

As also noted above, in some examples, in addition to GNSS data 232, GNSS aiding module 220 may further determine the aiding data based on seed data, such as seed data 234. Seed data 234 may be similar to A-GPS information (e.g., one or more of: an approximate time, satellite orbital data, and an approximate location of the mobile computing device). As shown in FIG. 2, GNSS aiding module 220 may obtain seed data 234 from application service (AP service) 230. AP service 230 may be a service that provides data to various components of mobile computing device 210. AP service 230 may obtain the data (e.g., seed data 234) from any suitable source or sources (e.g., sensors of mobile computing device 210, a network connection, a cellular network, etc.).

GNSS processor 216 may improve first fix determination (e.g., a reduction in TTFF or improved signal strength tolerance) by using aiding data 236. For instance, application processor 212 may have more powerful processing capabilities than GNSS processor 216 and therefore may perform calculations faster than GNSS processor 216 and/or may utilize more complex algorithms than GNSS processor 216. However, by contrast, application processor 212 may consume more electrical power than GNSS processor 216. For instance, if both application processor 212 and GNSS processor 216 were to perform identical calculations to track the position of mobile computing device 210, application processor 212 would use more electrical power, and thereby deplete a battery of mobile computing device 210 faster.

Figure 3:
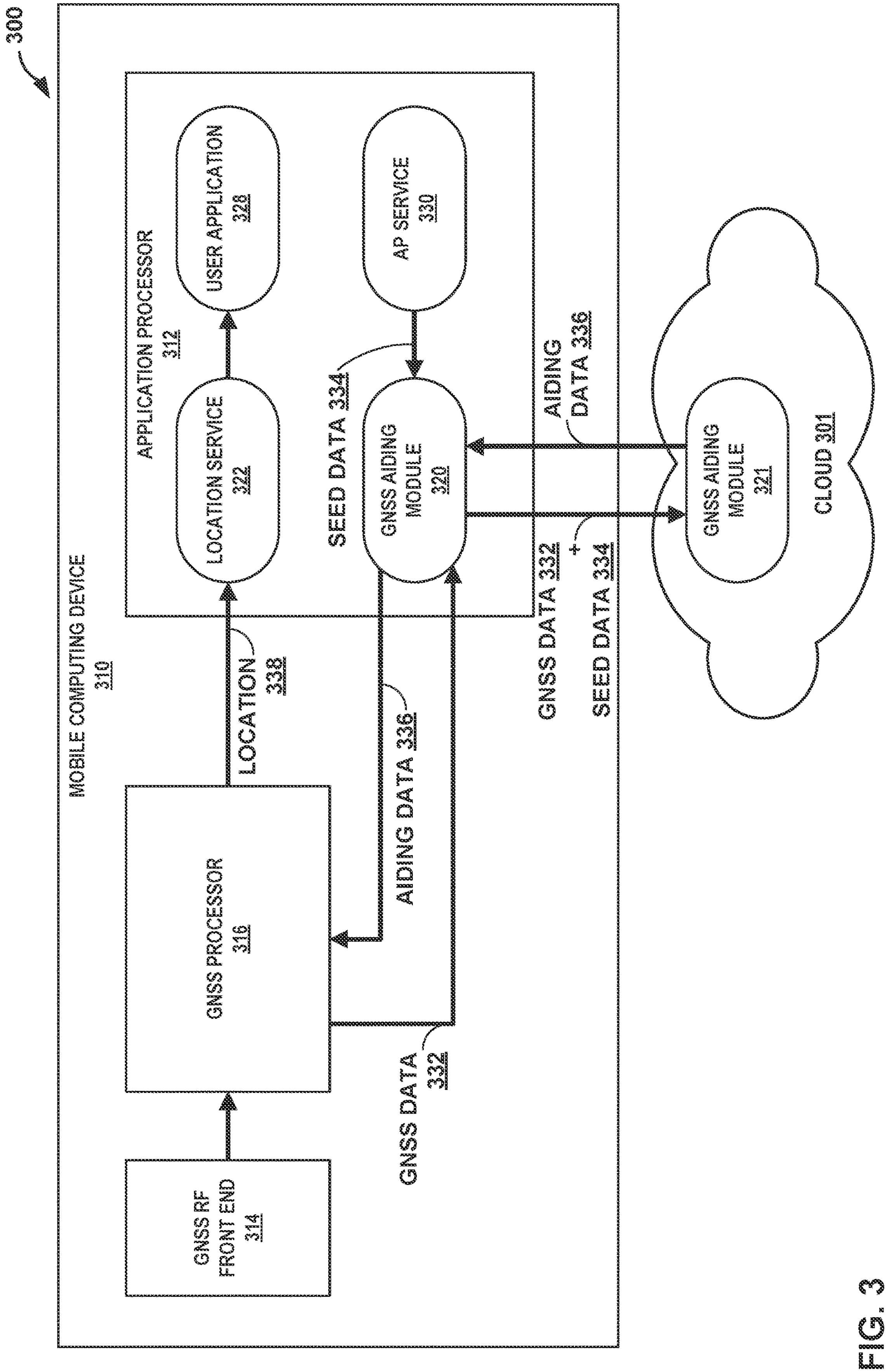
FIG. 3 is a conceptual diagram illustrating an example system 300 that includes mobile computing device 310 and cloud 301, in accordance with one or more aspects of this disclosure.

FIG. 3 is a conceptual diagram illustrating an example system 300 that includes mobile computing device 310 and cloud 301. Cloud 301 may represent network connected processing capacity that is external to mobile computing device 310. Mobile computing device 310 may communicate with components of cloud 301 using any suitable network connection (e.g., Internet, cellular, etc.).

Similar to mobile computing device 210 of FIG. 2, mobile computing device 310 of FIG. 3 may be an example of mobile computing device 110 of FIG. 1. However, mobile computing device 310 may be configured to utilize external processing capacity to generate aiding data 336. For instance, similar to GNSS aiding module 220, GNSS aiding module 320 may receive GNSS data 332 from GNSS processor 316 (and, in some examples, may also receive seed data 334 from AP service 330). As shown in FIG. 3, GNSS aiding module 320 may operate as a proxy for GNSS aiding module 321, which may be executed within cloud 301. In operation, GNSS aiding module 320 may output GNSS data 332 (and, in some examples, seed data 334) to GNSS aiding module 321 (e.g., via an Internet connection), which may then determine aiding data 336 and output aiding data 336 back to GNSS aiding module 320. Then, similar to GNSS aiding module 220, GNSS aiding module 320 may output aiding data 336 to GNSS processor 316.

Figure 4:
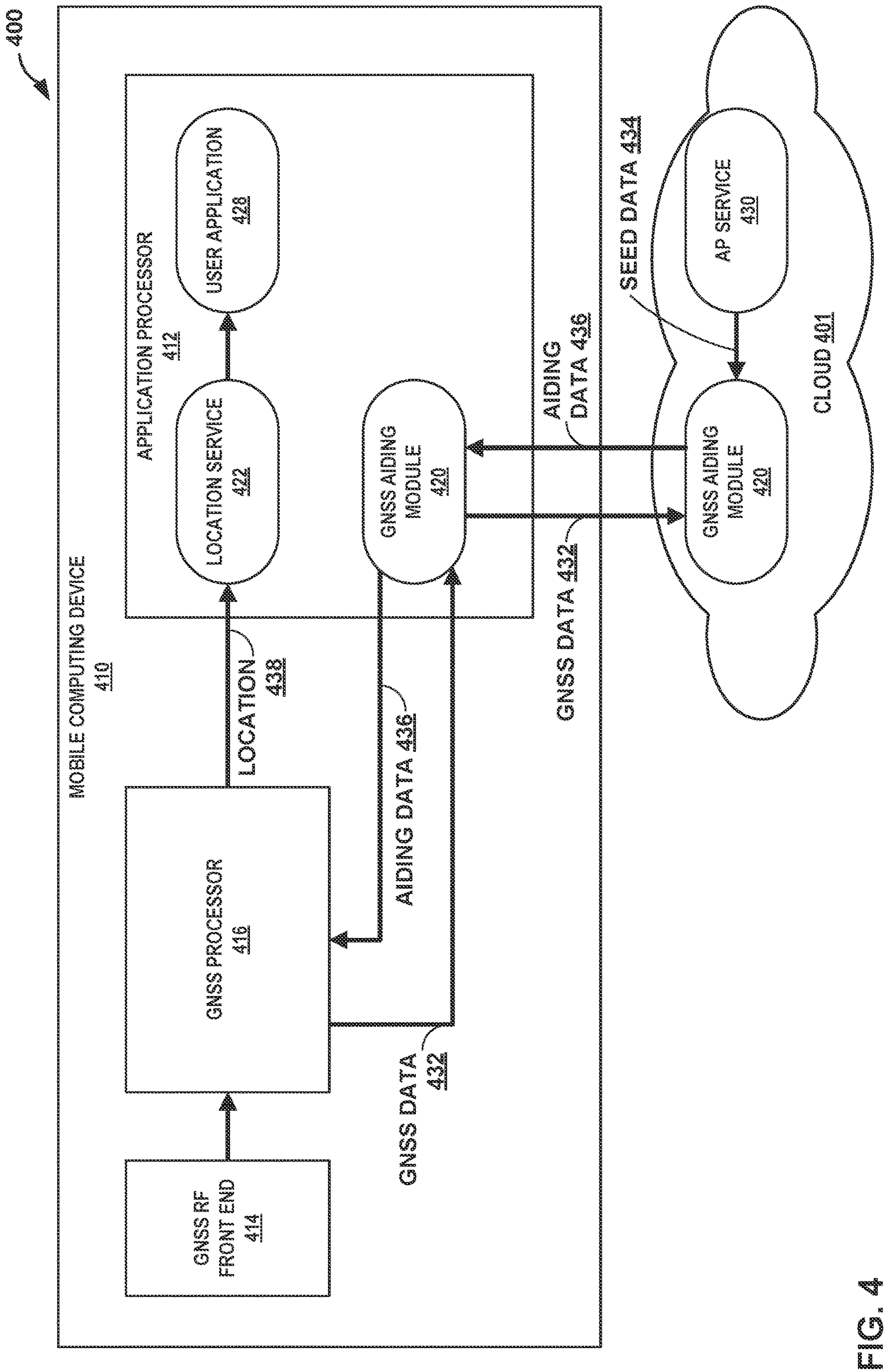
FIG. 4 is a conceptual diagram illustrating an example system 400 that includes mobile computing device 410 and cloud 401, in accordance with one or more aspects of this disclosure.

FIG. 4 is a conceptual diagram illustrating an example system 400 that includes mobile computing device 410 and cloud 401. Similar to mobile computing device 310 of FIG. 3 and mobile computing device 210 of FIG. 2, mobile computing device 410 of FIG. 4 may be an example of mobile computing device 110 of FIG. 1. Furthermore, similar to mobile computing device 310 of FIG. 3, mobile computing device 410 may be configured to utilize external processing capacity, such as GNSS aiding module 420, to generate aiding data 336. However, as shown in FIG. 4, GNSS aiding module 420 is configured to obtain at least some of seed data 434 from a source other than mobile computing device 410. For instance, as shown in FIG. 4, GNSS aiding module 420 may obtain at least some of seed data 434 via AP service 430, which may also be executed by cloud 401.

The examples of FIG. 3 and FIG. 4 may not be mutually exclusive. For instance, a GNSS aiding executing in a cloud (e.g., GNSS aiding module 320 or 420) may obtain seed data from both a mobile computing device (e.g., as shown in FIG. 3) and an external source (e.g., as shown in FIG. 4).

Figure 5:
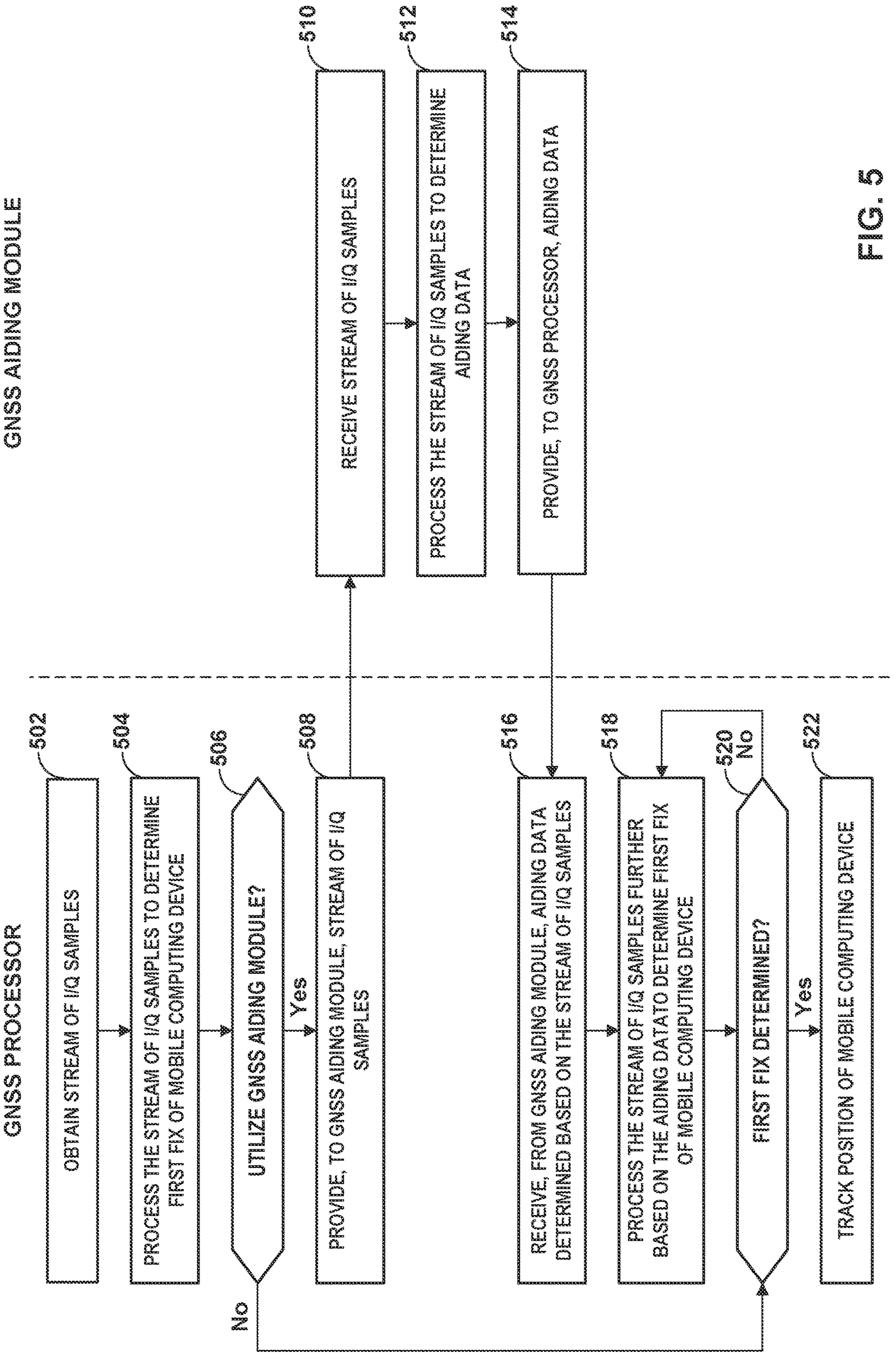
FIG. 5 is a flowchart illustrating example operations of an example mobile computing device in accordance with one or more aspects of the present disclosure.

FIG. 5 is a flowchart illustrating example operations of an example mobile computing device in accordance with one or more aspects of the present disclosure. Although the example operation of FIG. 5 is described as being performed by mobile computing device 110 of FIG. 1, in other examples some or all of the example operation may be performed by another computing device.

GNSS processor 116 may obtain a stream of I/Q samples (e.g., satellite data) (502). For instance, GNSS processor 116 may obtain the stream of I/Q samples from GNSS RF front end 114.

GNSS processor 116 may process the stream of I/Q samples to determine a first fix of mobile computing device 110 (504). For instance, GNSS processor 116 may process the stream of I/Q samples to determine a respective code phase, frequency, and time for a plurality of GNSS satellites 104 of FIG. 1. GNSS processor 116 may continue to process the stream of I/Q samples until a first fix is determined (520). However, as noted above, in some examples, performance of GNSS processor 116 to determine the first fix may be unsatisfactory. For instance, the time to first fix (TTFF) provided by GNSS processor 116 may be too long.

In accordance with one or more aspects of this disclosure, GNSS processor 116 may utilize a GNSS aiding module, such as GNSS aiding module 120, to improve first fix determination performance. In some examples, GNSS processor 116 may always utilize GNSS aiding module 120. In other examples, GNSS processor 116 may selectively determine whether or not to utilize GNSS aiding module 120 (506).

In examples where GNSS processor 116 selectively determines whether or not to utilize GNSS aiding module 120, GNSS processor 116 may base the determination on one or more factors. As one example, GNSS processor 116 may determine to utilize GNSS aiding module 120 in response to determining that GNSS processor 116 has not determined the first fix within a threshold time period (e.g., 5 seconds, 15 seconds, 30 seconds, etc.). As another example, GNSS processor 116 may determine to utilize GNSS aiding module 120 in response to determining that a signal strength of a signal received from a GNSS satellite is less than a threshold signal strength (e.g., that signal 106A from GNSS satellite 104A is too weak). As another example, GNSS processor 116 may determine to utilize GNSS aiding module 120 in response to determining that an approximate location of mobile computing device 110 is in a particular area. For instance, GNSS processor 116 may have a database of locations predetermined to be "difficult" GNSS locations (e.g., urban canyons, etc.). GNSS processor 116 may obtain the approximate location of mobile computing device 110 (e.g., within A~ GPS/A-GNSS data) and determine to utilize GNSS aiding module 120 where the approximate location of mobile computing device 110 is within the database of locations predetermined to be "difficult" GNSS locations.

Where GNSS processor 116 utilizes GNSS aiding module 120 in all situations, or responsive to determining to utilize GNSS aiding module 120 ("Yes" branch of 506), GNSS processor 116 may provide, to GNSS aiding module 120, the stream of I/Q samples (508).

GNSS aiding module 120 may receive the stream of I/Q samples (510), and process the stream of I/Q samples to determine aiding data (512). As noted above, the aiding data may include a code phase, a frequency, and a time for a GNSS satellite of the GNSS satellites. As also noted above, in some examples, GNSS aiding module 120 may perform the determination of the aiding data locally at mobile computing device 110 (e.g., FIG. 2). In other examples, GNSS aiding module 120 may perform the determination of the aiding data remote from mobile computing device 110 (e.g., FIGS. 3 and 4). GNSS aiding module 120 may provide the determined aiding data to GNSS processor 116 (514).

GNSS processor 116 may receive the aiding data (516) and utilize the aiding data in the processing of the stream of/Q samples to determine the first fix (518). For instance, GNSS processor 116 may process subsequently received I/Q samples in the stream of I/Q samples (e.g., samples different than those used by GNSS aiding module 120 to determine the aiding data) to determine the first fix. GNSS processor 116 may continue to process the stream of I/Q samples until the first fix is determined (520). As such, GNSS processor 116 may determine the first fix using a different portion of the stream of I/Q samples than the portion of the stream of I/Q samples used by GNSS aiding module 120 to determine the aiding data. As discussed above, the use of the aiding data may improve the performance of first fix determination by GNSS processor 116. For instance, GNSS processor 116 may utilize the aiding data to accelerate the processing by at least narrowing its code phase, frequency, and time search to acquire and track GNSS satellites faster than GNSS processor 116 could have on its own without the help of GNSS aiding module 120. As such, the time to first fix (TTFF) may be improved by the use of GNSS aiding module 120.

As shown in FIG. 5, GNSS processor 116 may commence processing the stream of I/Q samples prior to receiving the aiding data. As such, GNSS processor 116 may be considered to process the stream of I/Q samples in parallel with GNSS aiding module 120 determining the aiding data.

Responsive to determining the first fix ("Yes" branch of 520) GNSS processor 116 may enter a tracking mode (522). In the tracking mode, GNSS processor 116 may continue to process the I/Q samples to update the position estimate of mobile computing device 110. Aspects of this disclosure include the following examples.

Example 1

A method comprising: obtaining, by a global navigation satellite system (GNSS) processor of a mobile computing device and based on signals received from GNSS satellites, a stream of I/Q samples; providing, by the GNSS processor and for another processor, the stream of I/Q samples; receiving, by the GNSS processor and from the other processor, aiding data that is determined based on the stream of I/Q samples, wherein the aiding data that includes: a code phase, a frequency, and a time for a GNSS satellite of the GNSS satellites; and processing, by the GNSS processor and based on the aiding data, the stream of I/Q samples to determine a first fix for the mobile computing device.

Example 2

The method of example 1, wherein the other processor further determines the aiding data based on seed data.

Example 3

The method of example 2, wherein the seed data comprises one or more of: an approximate time, satellite orbital data, and an approximate location of the mobile computing device.

Example 4

The method of example 1, wherein: processing the stream of I/Q samples comprises commencing processing, by the GNSS processor, the stream of I/Q samples prior to receiving the aiding data; and accelerating, by the GNSS processor, the processing of the stream of I/Q samples based on the aiding data.

Example 5

The method of example 4, wherein: processing, by the GNSS processor, the stream of I/Q samples prior to receiving the aiding data comprises processing the stream of I/Q samples to search for the code phase, the frequency, and the time estimate for the GNSS satellite; and accelerating the processing of the stream of I/Q samples comprises narrowing, based on the aiding data, the search for the code phase, the frequency, and the time for the GNSS satellite.

Example 6

The method of example 5, wherein processing, by the GNSS processor, the stream of I/Q samples prior to receiving the aiding data comprises processing the stream of I/Q samples using assisted GNSS (A-GNSS).

Example 7

The method of example 1, wherein providing the stream of I/Q samples to the other processor comprises providing the stream of I/Q samples to the other processor in all situations when determining the first fix.

Example 8

The method of example 1, wherein providing the stream of I/Q samples to the other processor comprises providing the stream of I/Q samples to the other processor responsive to one or more of: determining that the GNSS processor has not determined the first fix within a threshold time period; determining that a signal strength of a signal received from the GNSS satellite is less than a threshold signal strength; and determining that an approximate location of the mobile computing device is in a particular area.

Example 9

The method of example 1, wherein the other processor is included in the mobile computing device.

Example 10

The method of example 9, wherein the other processor is an application processor of the mobile computing device.

Example 11

The method of example 1, wherein the other processor is not included in the mobile computing device, and wherein providing the stream of I/Q samples to the other processor comprises providing the stream of I/Q samples to the other processor via an Internet connection of the mobile computing device.

Example 12

The method of example 1, further comprising: tracking, by the GNSS processor and based on the first fix, a position of the mobile computing device.

Example 13

A mobile computing device comprising: a global navigation satellite system (GNSS) antenna; and a GNSS processor configured to: generate, based on signals received from GNSS satellites via the GNSS antenna, a stream of I/Q samples; provide, for another processor, the stream of I/Q samples; receive, by from the other processor, aiding data that is determined based on the stream of I/Q samples, wherein the aiding data that includes: a code phase, a frequency, and a time estimate for a GNSS satellite of the GNSS satellites; and process, based on the aiding data, the stream of I/Q samples to determine a first fix for the mobile computing device.

Example 14

The mobile computing device of claim 13, further comprising the other processor, wherein the other processor is configured to determine the aiding data based on both the stream of I/Q samples and seed data.

Example 15

The mobile computing device of claim 14, wherein the GNSS processor processes the stream of I/Q samples to search for the code phase, the frequency, and the time estimate for the GNSS satellite in parallel with the other processor determining the aiding data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:

obtaining, by a global navigation satellite system (GNSS) processor of a mobile computing device and based on signals received from GNSS satellites, a stream of I/Q samples;

providing, by the GNSS processor and for another processor of the mobile computing device, the stream of I/Q samples;

receiving, by the GNSS processor and from the other processor of the mobile computing device, aiding data that is determined based on the stream of I/Q samples, wherein the aiding data includes: a code phase, a frequency, and a time for a GNSS satellite of the GNSS satellites; and processing, by the GNSS processor and based on the aiding data, the stream of I/Q samples to determine a first fix for the mobile computing device.

2. The method of claim 1, wherein the other processor further determines the aiding data based on seed data.

3. The method of claim 2, wherein the seed data comprises one or more of:

an approximate time, satellite orbital data, and an approximate location of the mobile computing device.

4. The method of claim 1, wherein:

processing the stream of I/Q samples comprises commencing processing, by the GNSS processor, the stream of I/Q samples prior to receiving the aiding data; and accelerating, by the GNSS processor, the processing of the stream of I/Q samples based on the aiding data.

5. The method of claim 4, wherein:

processing, by the GNSS processor, the stream of I/Q samples prior to receiving the aiding data comprises processing the stream of I/Q samples to search for the code phase, the frequency, and the time estimate for the GNSS satellite; and accelerating the processing of the stream of I/Q samples comprises narrowing, based on the aiding data, the search for the code phase, the frequency, and the time for the GNSS satellite.

6. The method of claim 5, wherein processing, by the GNSS processor, the stream of I/Q samples prior to receiving the aiding data comprises processing the stream of I/Q samples using assisted GNSS (A-GNSS).

7. The method of claim 1, wherein providing the stream of I/Q samples to the other processor comprises providing the stream of I/Q samples to the other processor in all situations when determining the first fix.

8. The method of claim 1, wherein providing the stream of I/Q samples to the other processor comprises providing the stream of I/Q samples to the other processor responsive to one or more of:

determining that the GNSS processor has not determined the first fix within a threshold time period;

determining that a signal strength of a signal received from the GNSS satellite is less than a threshold signal strength; and determining that an approximate location of the mobile computing device is in a particular area.

9. The method of claim 1, wherein the other processor is an application processor of the mobile computing device.

10. The method of claim 1, wherein the other processor is not included in the mobile computing device, and wherein providing the stream of I/Q samples to the other processor comprises providing the stream of I/Q samples to the other processor via an Internet connection of the mobile computing device.

11. The method of claim 1, further comprising:

tracking, by the GNSS processor and based on the first fix, a position of the mobile computing device.

12. A mobile computing device comprising:

a global navigation satellite system (GNSS) antenna;

a GNSS processor; and another processor, wherein the GNSS processor is configured to:

generate, based on signals received from GNSS satellites via the GNSS antenna, a stream of I/Q samples;

provide, for the other processor, the stream of I/Q samples;

receive, from the other processor, aiding data that is determined based on the stream of I/Q samples, wherein the aiding data includes: a code phase, a frequency, and a time estimate for a GNSS satellite of the GNSS satellites; and process, based on the aiding data, the stream of I/Q samples to determine a first fix for the mobile computing device.

13. The mobile computing device of claim 12, further comprising the other processor, wherein the other processor is configured to determine the aiding data based on both the stream of I/Q samples and seed data.

14. The mobile computing device of claim 13, wherein the GNSS processor processes the stream of I/Q samples to search for the code phase, the frequency, and the time estimate for the GNSS satellite in parallel with the other processor determining the aiding data.

15. The mobile computing device of claim 12, wherein, to provide the stream of I/Q samples to the other processor, the GNSS processor is configured to provide the stream of I/Q samples to the other processor responsive to one or more of:

a determination that the GNSS processor has not determined the first fix within a threshold time period;

a determination that a signal strength of a signal received from the GNSS satellite is less than a threshold signal strength; and a determination that an approximate location of the mobile computing device is in a particular area.

16. The mobile computing device of claim 12, wherein the other processor is an application processor of the mobile computing device.

* * * * *